United States Patent
Vahidnia et al.

(10) Patent No.: US 12,536,319 B2
(45) Date of Patent: Jan. 27, 2026

(54) CONTROLLING APPLICATION ACCESS TO SENSITIVE DATA

(71) Applicant: Microsoft Technology Licensing, LLC, Redmond, WA (US)

(72) Inventors: Arash Vahidnia, Bellevue, WA (US); Vasundhara Puttagunta, Hyderabad (IN); Rajalakshmi Dani, Redmond, WA (US); Anand Madhava Menon, Redmond, WA (US); Neha Arora, Newcastle, WA (US); Himani Arora, Hyderabad (IN); Richa Sehgal, Bengaluru (IN); Rufino Louie Mayor, Jr., Snohomish, WA (US); Sanjoyan Mustafi, Redmond, WA (US); Himanshu Jindal, Gurugram (IN); Sumit Kumar Chauhan, Hyderabad (IN); Caleb Geoffrey Baker, Seattle, WA (US); Nikhil Reddy Boreddy, Bellevue, WA (US); Shuvam Singha Roy, Kolkata (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 299 days.

(21) Appl. No.: 17/835,050

(22) Filed: Jun. 8, 2022

(65) Prior Publication Data
US 2023/0401332 A1 Dec. 14, 2023

(51) Int. Cl.
G06F 21/62 (2013.01)
G06F 21/31 (2013.01)
(Continued)

(52) U.S. Cl.
CPC .......... *G06F 21/6245* (2013.01); *G06F 21/31* (2013.01); *G06F 21/604* (2013.01); *H04L 63/102* (2013.01)

(58) Field of Classification Search
CPC . H04L 63/0876; H04L 63/101; H04L 63/105; G06F 21/57; G06F 21/62
See application file for complete search history.

(56) References Cited

U.S. PATENT DOCUMENTS 10,594,692 B2 * 3/2020 Oberheide ............ H04L 63/205
2006/0129572 A1 6/2006 Cole et al.
(Continued)

FOREIGN PATENT DOCUMENTS

GB 2572471 A 10/2019

OTHER PUBLICATIONS

"App protection policies overview", retrieved from <<https://docs.microsoft.com/en-us/mem/intune/apps/app-protection-policy>>, Mar. 21, 2022, 25 pages.
(Continued)

*Primary Examiner* — Eric W Shepperd

(57) ABSTRACT

Some embodiments control access by applications to resources in a computing environment. An embodiment notes a request from an application to access a resource, determines a compliance status of the application based on access control policy compliance criteria, ascertains an authorization status of the request based on an authorization credential of the request and an authorization requirement of the resource, and responds to the request based on the compliance status and also based on the authorization status, thereby providing fine-grained access control. Access may also be controlled based on a request's beneficiary. An access request response may allow access, deny access, or ask for additional authorization. A compliance classifier
(Continued)

reduces risk by dynamically updating compliance status after compliance criteria changes or attribute changes. An identity service access control architecture uses a compliance attribute to improve efficiency. Applications may be access control grouped according to resource sensitivity labels.

19 Claims, 5 Drawing Sheets

(51) Int. Cl.
*G06F 21/60* (2013.01)
*H04L 9/40* (2022.01)

(56) References Cited

U.S. PATENT DOCUMENTS

| | | | |
|---|---|---|---|
| 2007/0005320 A1* | 1/2007 | Vinberg | H04L 41/0894 703/13 |
| 2007/0299823 A1 | 12/2007 | Getsch et al. | |
| 2009/0182710 A1 | 7/2009 | Short et al. | |
| 2009/0204635 A1 | 8/2009 | McCormack et al. | |
| 2009/0307661 A1 | 12/2009 | Vierzba et al. | |
| 2012/0060210 A1 | 3/2012 | Baker et al. | |
| 2012/0084244 A1 | 4/2012 | Baker et al. | |
| 2013/0067539 A1 | 3/2013 | Langworthy et al. | |
| 2013/0103639 A1 | 4/2013 | Greenberg et al. | |
| 2013/0179798 A1 | 7/2013 | Korupolu et al. | |
| 2013/0290944 A1 | 10/2013 | Menon et al. | |
| 2013/0305312 A1* | 11/2013 | Gomez | H04L 63/104 726/1 |
| 2014/0189797 A1 | 7/2014 | Nori et al. | |
| 2014/0282821 A1* | 9/2014 | Adler | H04L 63/10 726/1 |
| 2014/0331277 A1* | 11/2014 | Frascadore | G06F 9/45558 726/1 |
| 2015/0143524 A1* | 5/2015 | Chestna | G06F 8/30 726/25 |
| 2015/0271200 A1 | 9/2015 | Brady et al. | |
| 2015/0281225 A1 | 10/2015 | Schoen et al. | |
| 2016/0085784 A1 | 3/2016 | McCormack et al. | |
| 2016/0105420 A1* | 4/2016 | Engan | H04W 12/068 455/411 |
| 2016/0110558 A1* | 4/2016 | Pohl | H04L 63/20 726/1 |
| 2016/0182487 A1 | 6/2016 | Zhu et al. | |
| 2016/0182525 A1 | 6/2016 | Zhu et al. | |
| 2016/0277411 A1 | 9/2016 | Dani et al. | |
| 2016/0292694 A1* | 10/2016 | Goldschlag | H04L 63/20 |
| 2017/0070465 A1* | 3/2017 | Gruver | H04L 51/42 |
| 2017/0223012 A1* | 8/2017 | Xu | H04L 63/0807 |
| 2017/0289168 A1* | 10/2017 | Bar | H04L 63/1408 |
| 2017/0302677 A1 | 10/2017 | Dani et al. | |
| 2018/0054460 A1 | 2/2018 | Brady et al. | |
| 2018/0063153 A1 | 3/2018 | Zhu et al. | |
| 2018/0234406 A1 | 8/2018 | Deurbrouck et al. | |
| 2018/0314713 A1 | 11/2018 | Penangwala et al. | |
| 2019/0089710 A1 | 3/2019 | Weinert et al. | |
| 2019/0089743 A1 | 3/2019 | Ramaswamy et al. | |
| 2019/0281087 A1* | 9/2019 | Nieves | H04L 63/101 |
| 2019/0354690 A1* | 11/2019 | Brigandi | H04W 12/126 |
| 2020/0007535 A1 | 1/2020 | Barhudarian et al. | |
| 2020/0204589 A1* | 6/2020 | Strogov | H04L 63/1416 |
| 2020/0285761 A1* | 9/2020 | Buck | G06F 21/51 |
| 2021/0135869 A1 | 5/2021 | Barhudarian et al. | |
| 2021/0136076 A1 | 5/2021 | Barhudarian et al. | |
| 2021/0136078 A1 | 5/2021 | Barhudarian et al. | |
| 2021/0136113 A1 | 5/2021 | Barhudarian et al. | |
| 2021/0136114 A1 | 5/2021 | Barhudarian et al. | |
| 2021/0160325 A1 | 5/2021 | Lee et al. | |
| 2021/0211470 A1 | 7/2021 | Wood et al. | |
| 2021/0336966 A1* | 10/2021 | Gujarathi | H04L 9/3247 |
| 2023/0401332 A1* | 12/2023 | Vahidnia | G06F 21/31 |

OTHER PUBLICATIONS

"Conditional Access: Conditions", retrieved from <<https://docs.microsoft.com/en-us/azure/active-directory/conditional-access/concept-conditional-access-conditions>>, Apr. 27, 2022, 12 pages.

Danny Kadyshevitch, "Block Access to Unsanctioned Apps with Microsoft Defender ATP & Cloud App Security", retrieved from <<https://techcommunity.microsoft.com/t5/security-compliance-and-identity/block-access-to-unsanctioned-apps-with-microsoft-defender-atp/ba-p/1121179>>, Jan. 21, 2020, 14 pages.

"Connect apps", retrieved from <<https://docs.microsoft.com/en-us/defender-cloud-apps/enable-instant-visibility-protection-and-governance-actions-for-your-apps>>, Feb. 21, 2022, 10 pages.

"Information protection policies", retrieved from <<https://docs.microsoft.com/en-us/defender-cloud-apps/policies-Information-protection>>, Dec. 20, 2021, 13 pages.

Alex Weinert, "Granular Conditional Access for sensitive data and actions", retrieved from <<https://techcommunity.microsoft.com/t5/azure-active-directory-identity/granular-conditional-access-for-sensitive-data-and-actions/ba-p/1751775>>, Mar. 8, 2021, 9 pages.

"Protect apps with Microsoft Defender for Cloud Apps Conditional Access App Control", retrieved from <<https://github.com/MicrosoftDocs/CloudAppSecurityDocs/blob/master/CloudAppSecurityDocs/proxy-intro-aad.md?msclkid=d5f96f3aafe411eca4c7051368fd934e>>, Jan. 6, 2022, 9 pages.

"Microsoft Defender for Cloud Apps overview", retrieved from <<https://docs.microsoft.com/en-us/defender-cloud-apps/what-is-defender-for-cloud-apps>>, Jan. 2, 2022, 7 pages.

"Use the portal to create an Azure AD application and service principal that can access resources", retrieved from <<https://docs.microsoft.com/en-us/azure/active-directory/develop/howto-create-service-principal-portal>>, Nov. 2, 2021, 14 pages.

Mattsoseman, "Govern Access to Sensitive Data using Conditional Access & Azure Information Protection", retrieved from <<https://mattsoseman.wordpress.com/2019/11/10/govern-access-to-sensitive-data-using-conditional-access-azure-information-protection/?msclkid=d5f8f597afe411ecac8c6ad7aa4b2d88>>, Nov. 10, 2019, 4 pages.

"What is Conditional Access?", retrieved from <<https://docs.microsoft.com/en-us/azure/active-directory/conditional-access/overview>>, Apr. 15, 2022, 6 pages.

"Use app-only authentication with the Microsoft Graph PowerShell SDK", retrieved from <<https://docs.microsoft.com/en-us/graph/powershell/app-only?tabs=azure-portal>>, Apr. 12, 2022, 7 pages.

"OpenID Connect Core 1.0 incorporating errata set 1", retrieved from <<https://openid.net/specs/openid-connect-core-1_0.html>>, Nov. 8, 2014, 86 pages.

"Developer guide to Conditional Access authentication context", retrieved from <<https://docs.microsoft.com/en-us/azure/active-directory/develop/developer-guide-conditional-access-authentication-context?msclkid=4c04a9c8afe411ec90d29fb3c7e2e2cd>>, May 15, 2022, 11 pages.

Debbie Seres, "Step 4. Set conditional access policies: top 10 actions to secure your environment", retrieved from <<https://www.microsoft.com/security/blog/2019/01/30/step-4-set-conditional-access-policies-top-10-actions-to-secure-your-environment/>>, Jan. 30, 2019, 11 pages.

"Information Protection and Data Loss Prevention", retrieved from <<https://microsoft.github.io/ComplianceCxE/dag/mip-dlp/>>, May 10, 2021, 19 pages.

"International Search Report and Written Opinion Issued in PCT Application No. PCT/US23/022177", Mailed Date: Aug. 24, 2023, 12 Pages.

* cited by examiner

CONTROLLING APPLICATION ACCESS TO SENSITIVE DATA

BACKGROUND

Noon Efforts to damage or violate the confidentiality, availability, integrity, or privacy of data in a computing system may take many different forms, including some forms which are difficult to predict, and attacks which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made against a computing system. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. Some defenses might not be feasible or cost-effective for the computing system. However, improvements in cybersecurity remain possible, and worth pursuing.

SUMMARY

Some embodiments described herein address technical challenges related to access control in a network environment, and more specifically challenges related to controlling access by applications to data and other resources in a cloud environment. Some embodiments are configured to perform resource access control which includes noting a request from an application to access a resource, determining a compliance status of the application with respect to one or more application compliance criteria of an access control policy, ascertaining an authorization status of the request with respect to an authorization credential of the request and an authorization requirement of the resource, and responding to the request based on the compliance status and also based on the authorization status. Responding to the request may include allowing the requested access, denying the requested access, or providing some other response pursuant to the access control policy, e.g., asking for additional authorization before granting or denying access.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
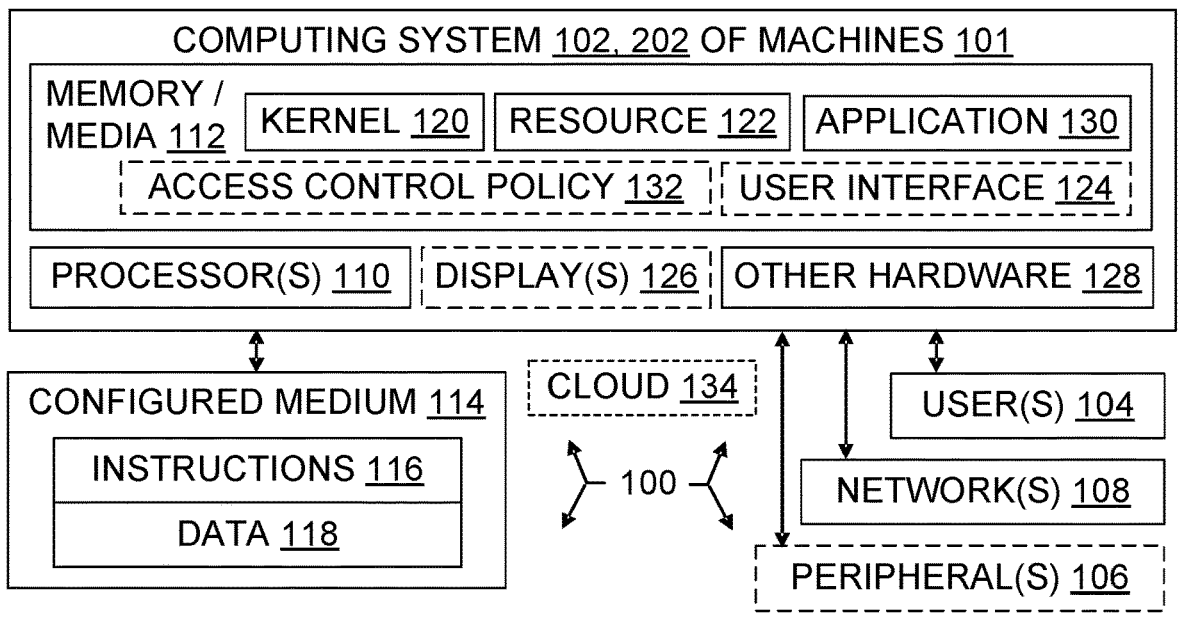
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to help protect sensitive data in a cloud environment that potentially contains millions of applications which collectively come from a wide variety of sources. Some applications come from widely recognized vendors, for example, while other application sources are less well known.

Microsoft innovators explored various ways to effectively control access to sensitive data in such an environment. The innovators recognized that data content could be labeled as sensitive, but also determined that sensitivity labels are not necessarily checked by every application before the application accesses data. Moreover, some applications that do check sensitivity labels do not then conform their behavior to the access restrictions which are indicated by those sensitivity labels, whether as a result of error, or accident, or malice.

The innovators also recognized that various efforts have been made to control access on a per-user basis, or to control access based on assigned roles. In some Microsoft environments, for example, access to resources may be restricted according to a role that was assigned to a service principal; a service principal is one example of an application. However, the innovators concluded that better approaches are possible for controlling access to resources by applications, particularly in very large cloud environments.

In particular, the innovators formulated a scalable and efficient access control approach in which one or more aspects of a resource, aspects of a resource access request made by an application, and aspects of the application itself are each considered. Based on the aspects considered, an embodiment determines whether to allow the requested access, deny the requested access, or respond to the request in another manner.

In some computing environments, it may be the case that even though access to certain resources is restricted to applications which are executing in an admin role, executing in that role by itself should not always be a sufficient basis for allowing access. An admin role service that performs scheduled backups of sensitive quarterly financial data, for example, should not necessarily be able to also access sensitive marketing plans.

In short, the innovators concluded that technology to control application access to sensitive data or other resources in a cloud environment would be improved by considering both resource characteristics and application characteristics, as opposed to relying only on sensitivity labels or relying only on roles, for example. But creating practical solutions poses technical challenges, such as: how to scale asset control efficiently to handle many (thousands, perhaps even millions) of applications from a wide variety of sources, how to respond computationally to changes in application characteristics, and how to leverage existing access control tools without being limited to their capabilities.

To help provide access control functionalities that address these and other scenarios, the innovators formulated an access control approach that conditions resource access on which resource would be accessed and in what way, which access credentials are presented by the resource access request, and whether the requesting application itself satisfies specified access policy compliance criteria.

In some embodiments, an application is assigned a compliance status which is based on the application's attributes and on compliance criteria from a policy. The application makes a request for access to a resource. The request has an authorization status which is based on an authorization credential in the request and an authorization requirement of the resource. The application is then allowed or denied access to the resource based on both the compliance status and the authorization status.

By utilizing an identity service to represent the resource and the application, some embodiments beneficially facilitate scaling asset control capabilities efficiently to handle many applications from a wide variety of sources. Appropriately tailored identity service representations may also beneficially leverage existing identity services as access control tools. Some embodiments similarly leverage sensitivity labels to help scale asset control efficiently, despite the presence of millions of applications in an environment.

By running an application compliance classifier, some embodiments beneficially respond computationally and promptly to changes in application characteristics. The classifier may execute in an event-driven mode, periodically, or continuously. Some embodiments update the compliance status in near real-time and thereby help restrict access to sensitive content by an application within a few seconds of the application becoming non-compliant.

One of skill in the computing arts who is informed by the teachings provided herein will acknowledge that embodiments described herein also address other technical challenges, and also provide other technical benefits.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Applications 130 may include software apps on mobile devices 102 or workstations 102 or servers 102, as well as APIs 716, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, application resource access control functionality could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
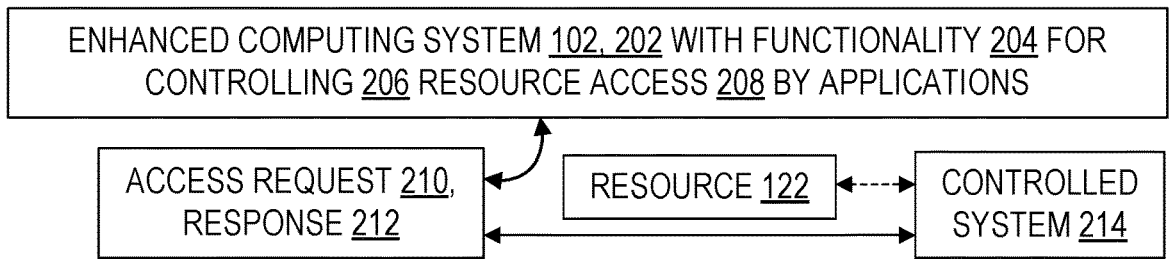
FIG. 2 is a diagram illustrating aspects of a computing system which has one or more of the application resource access control enhancements taught herein for controlling access to a resource by an application.

FIG. 2 illustrates a computing system 102 configured by one or more of the application resource access control enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
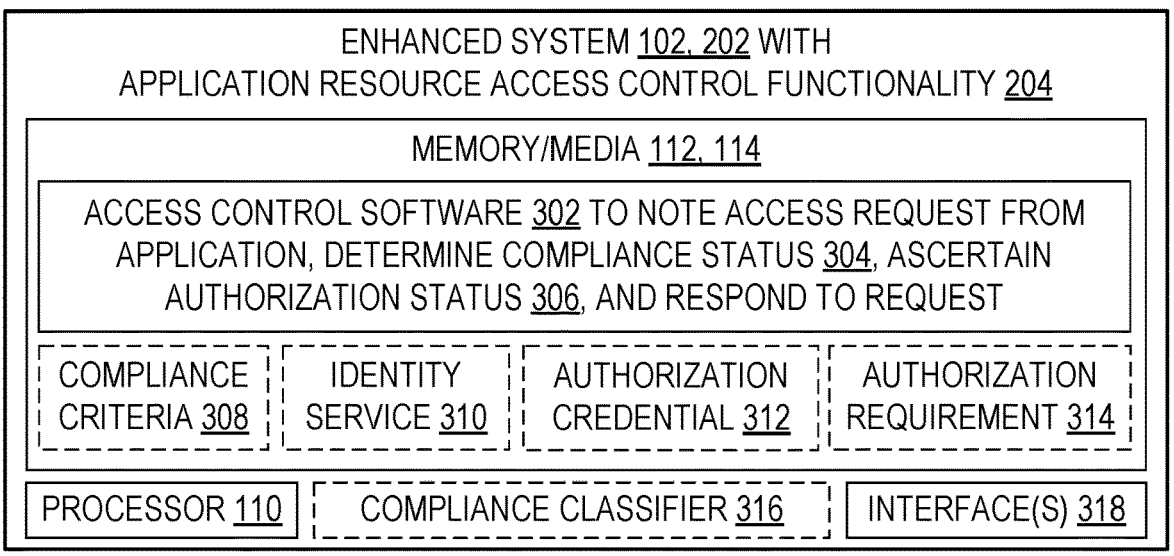
FIG. 3 is a block diagram illustrating an enhanced system configured with application resource access control functionality.

FIG. 3 illustrates an enhanced system 202 which is configured with access control software 302 to help provide application resource access control functionality 204. Software 302 and other FIG. 3 items are discussed at various points herein, and additional details regarding them are provided in the discussion of a List of Reference Numerals later in this disclosure document.

Figure 4:
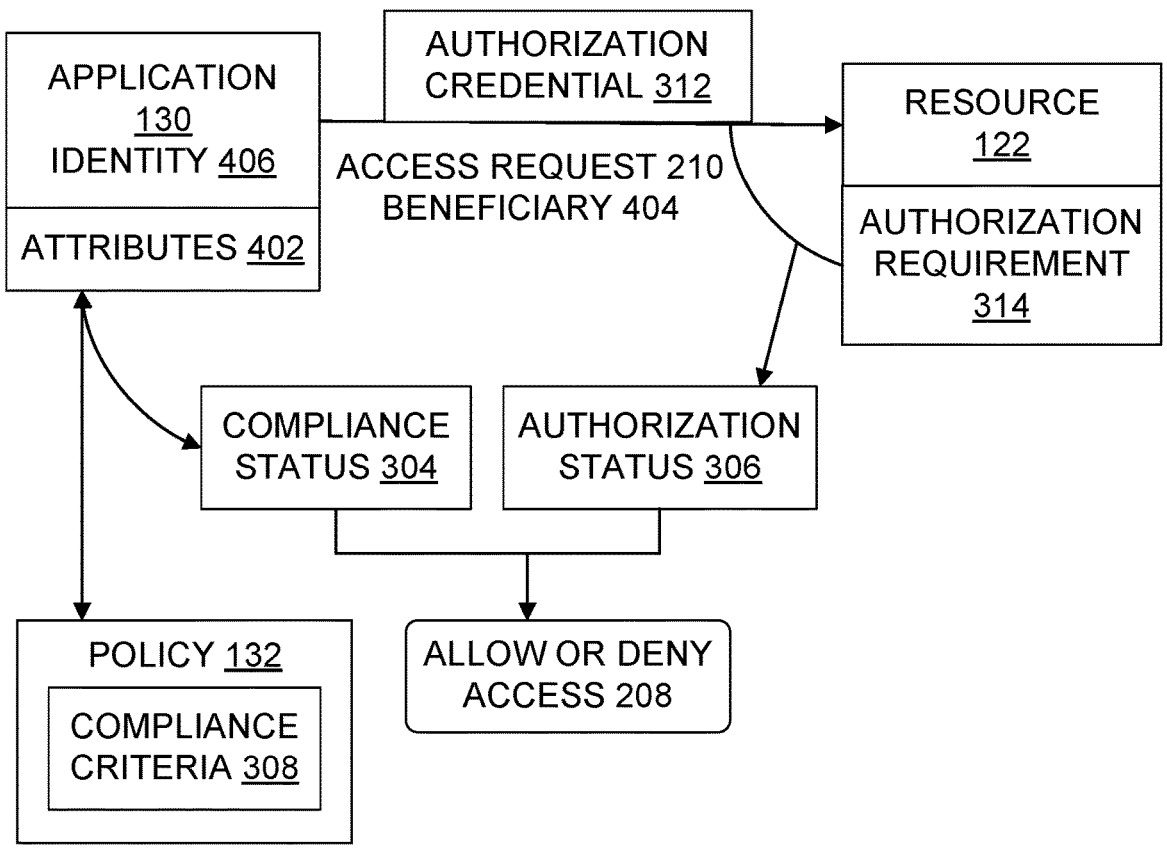
FIG. 4 is a data flow diagram illustrating some aspects of application resource access control in some architectures.
Figure 10:
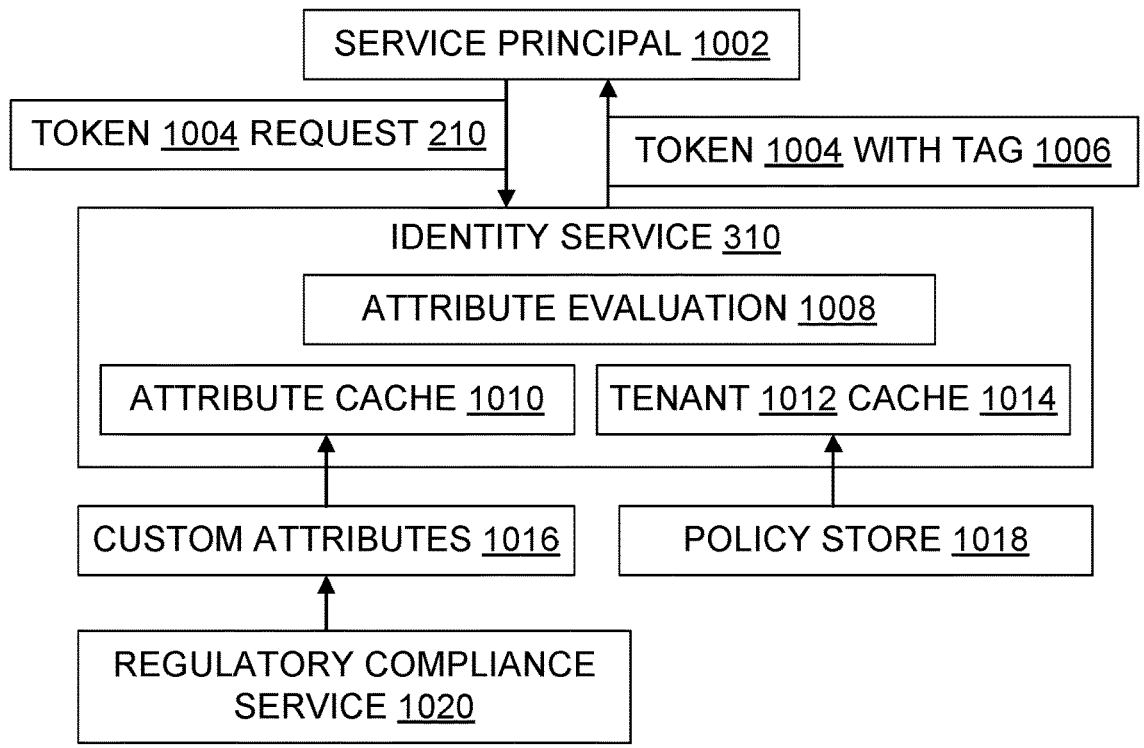
FIG. 10 is a data flow diagram illustrating a fully internal evaluation architecture for application resource access control.
Figure 11:
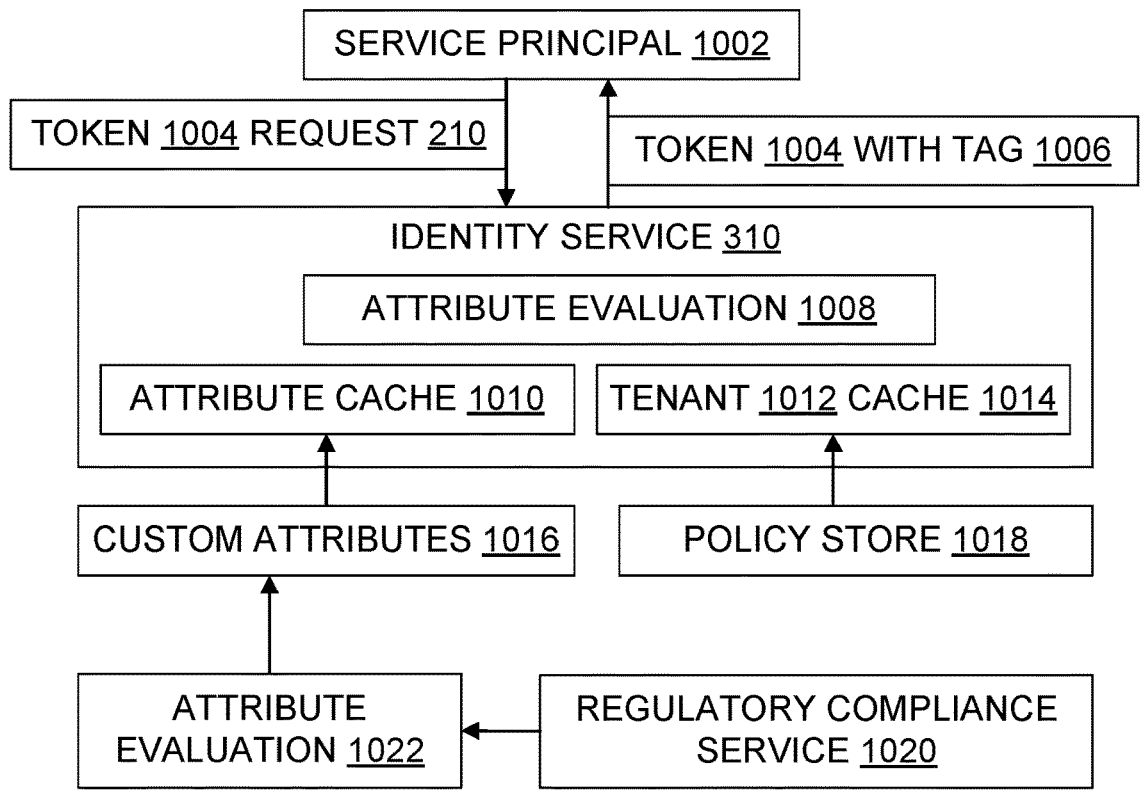
FIG. 11 is a data flow diagram illustrating a partially external evaluation architecture for application resource access control.

FIGS. 4, 10, and 11 show some aspects of application resource access control architectures. This is not a comprehensive summary of all approaches to application resource access control, or a comprehensive summary of all aspects of an environment 100 or system 202 or other architectural context of application resource access control functionality 204, or a comprehensive summary of all application resource access control data 118 or other data structures or data flow functionalities or other mechanisms for potential use in or with a system 102 or 202. FIGS. 4, 10, and 11 items are discussed at various points herein, and additional details regarding them are provided in the discussion of a List of Reference Numerals later in this disclosure document.

In some embodiments illustrated by FIG. 4, an application 130 is assigned a compliance status 304 which is computationally based on the application's attributes 402 and on compliance criteria 308 from a policy 132. The application makes a request 210 for access 208 to a resource 122. The request has an authorization status 306 which is computationally based on an authorization credential 312 in the request and an authorization requirement 314 of the resource 122. The application 130 is allowed or denied access 208 to the resource based on both the compliance status and the authorization status.

For example, suppose the compliance criteria 308 specify a registration age of at least thirty days, a valid application certificate 626 which identifies the application's publisher, and the identified publisher not being on a deny list of untrusted app publishers. Suppose the application has a compliant attribute 402 indicating that these criteria 308 are satisfied. Suppose also that the authorization requirement 314 specifies a top-secret clearance level, and that the authorization credential 312 indicates top secret clearance. Then the request 210 for access would be granted 922.

In a variation, suppose the application was registered twenty days ago. Since the compliance criterion 308 specifying a registration age of at least thirty days is not satisfied, access will be denied 924 on the basis of the compliance status 304, because the compliance status will be "non-compliant", "failed", "untrusted", or a similar value.

In another variation, suppose the authorization credential indicates a clearance level below top-secret clearance. Then access will be denied 924 on the basis of the authorization status 306, because the authorization status will be "not authorized", "permission not found", or a similar value.

Many other variations will also be apparent to one of skill informed by the teachings presented herein.

Figure 5:
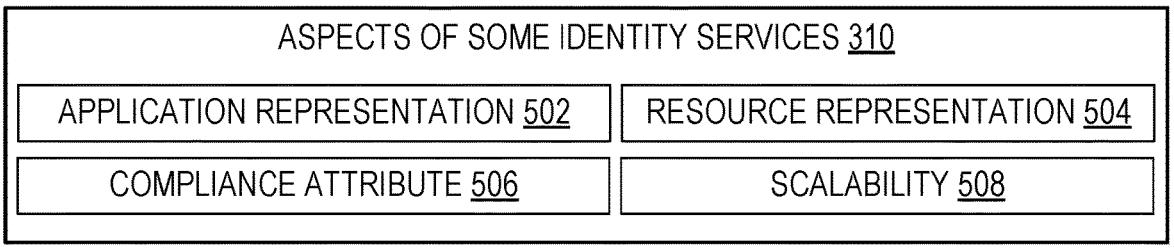
FIG. 5 is a block diagram illustrating aspects of some identity services.

FIG. 5 illustrates aspects of an identity service 310 which may be configured with access control data structures such as representations 502, 504, and attributes 506, to help provide application resource access control functionality 204. FIG. 5 items are discussed at various points herein, and additional details regarding them are provided in the discussion of a List of Reference Numerals later in this disclosure document.

Figure 6:
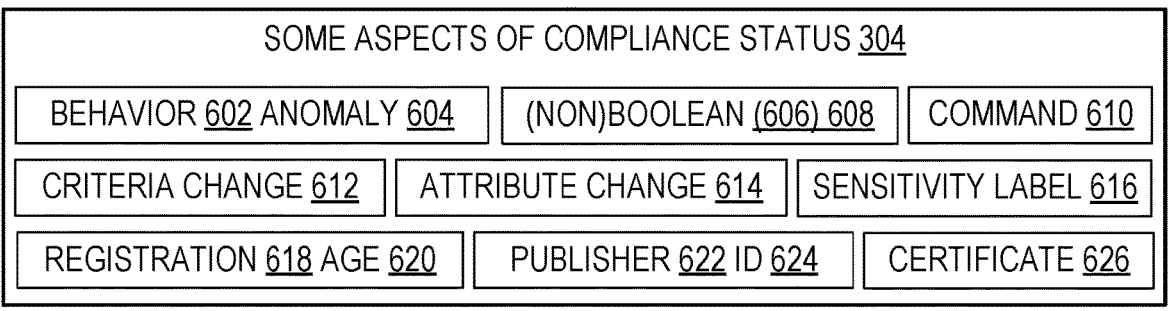
FIG. 6 is a block diagram illustrating some aspects of application compliance status.

FIG. 6 illustrates aspects of application compliance status 304. This is not a comprehensive summary of all aspects of application 130 compliance to an access control policy 132. FIG. 6 items are discussed at various points herein, and additional details regarding them are provided in the discussion of a List of Reference Numerals later in this disclosure document.

Figures 7, 8:
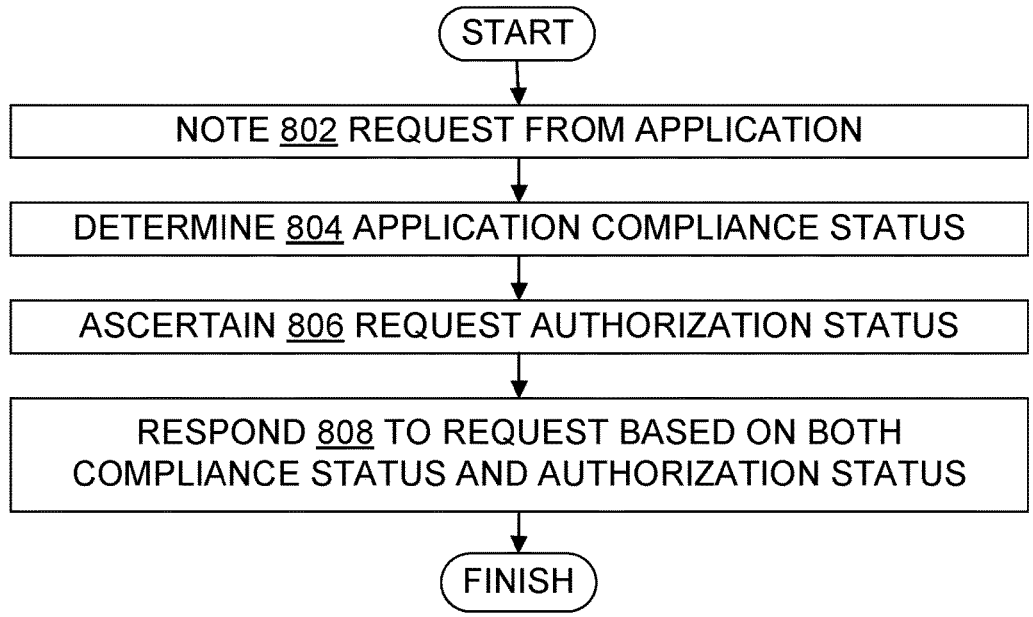
FIG. 7 is a block diagram illustrating some examples of resources in a computing environment.
FIG. 8 is a flowchart illustrating steps in an example method for application resource access control.

FIG. 7 illustrates examples of resources 122 in a computing environment 100, e.g., in a cloud 134. This is not a comprehensive summary of all resources 122. FIG. 7 items are discussed at various points herein, and additional details regarding them are provided in the discussion of a List of Reference Numerals later in this disclosure document.

In some embodiments, the enhanced system 202 may be networked through an interface 318. An interface 318 may include hardware such as network interface cards, software such as network stacks, APIs, or sockets, combination items such as network connections, or a combination thereof.

In some embodiments, an enhanced system 202 includes a computing system 202 which is configured to perform resource access control. The enhanced system 202 includes a digital memory 112 and a processor 110 in operable communication with the memory. In a given embodiment, the digital memory 112 may be volatile or nonvolatile or a mix. The enhanced system 202 also includes a processor 110 in operable communication with the digital memory 112. The processor is configured to perform resource access control including: noting 802 a request 210 from an application 130 to access a resource 122, determining 804 a compliance status 304 of the application with respect to one or more application compliance criteria 308 of an access control policy 132, ascertaining 806 an authorization status 306 of the request with respect to an authorization credential 312 of the request and an authorization requirement 314 of the resource, and responding 808 to the request based on the compliance status and also based on the authorization status. Determining 804 compliance status 304 and ascertaining 806 authorization status 306 include computation, as well as storage of computational results so those results can be read during execution of the responding 808 computation.

Some embodiments store compliance status as a tag (a.k.a. an attribute 402) in an identity service 310 such as a Microsoft Active Directory® or Azure® Active Directory® identity service 310 or another identity service 310. In some embodiments, the system 202 includes an identity service 310 containing an identity representation 502 of the application 130, and determining 804 the compliance status of the application includes checking 902 the application identity representation 502 for a compliance attribute 506, 402.

Some embodiments store authorization status as a tag (a.k.a. an attribute 402) in an identity service 310 such as a Microsoft Active Directory® or Azure® Active Directory® identity service 310 or another identity service 310. In particular, the authorization requirement tag could be an authentication context tag 1006. In some embodiments, the system 202 includes an identity service 310 containing an identity representation 504 of the resource 122, and ascertaining 806 the authorization status of the request includes checking 904 the resource identity representation 504 for the authorization requirement 314.

Some embodiments optimize resource access control by reducing memory and CPU usage at a policy 132 evaluation time for a token service of an identity service 310. This is illustrated in FIGS. 10 and 11, which are discussed in greater detail later in this disclosure. In some embodiments which are consistent with FIG. 11 the system 202 includes an identity service 310 containing an identity representation 502 of the application having a compliance attribute 506, and the system also includes a set of additional application attributes 502 which are not stored in the identity service 310, e.g., custom attributes 1016. This system 202 is configured to set 936 the compliance attribute based at least in part on the additional application attributes 502, and determining 804 the compliance status in response to the access request includes checking 902 the compliance attribute without also checking the additional application attributes.

Some embodiments utilize or include an app compliance classifier 316, e.g., a machine learning classifier that classifies 804 new apps 130 or periodically revisits 804 apps 130. In some embodiments, the system 202 includes an application compliance classifier 316 which is configured to upon execution determine 804 a respective compliance status 304 of multiple respective applications 130 with respect to the compliance criteria 308 of the access control policy 132.

The application compliance classifier 316 may also be referred to as a compliance evaluation engine 316. In some embodiments, evaluation engine 316 includes a Spark®-based application which is designed to handle analysis of large amounts of data to find violations of a set of policy rules 308 furnished to it (mark of the Apache Software Foundation). The engine 316 may be deployed to read through metadata of the cloud applications along with their usage and behavioural data to classify them. If any of these applications are in non-compliance to the policies defined by the organization, the engine reports that non-compliance on request or sets the compliance attribute 506 accordingly.

Some embodiments update the compliance status in near real-time and thereby restrict access to sensitive content by an application within seconds of the application becoming non-compliant. An engine 316 may do so by listening to any changes on properties 402 of the application that are used to define the condition 308 for compliance and use those change events to signal recomputing 804 of the compliance status of the application. As a result, these embodiments are able to change the compliance status for the application in near-real time (e.g., under ten seconds) and thereby restrict 206 access to sensitive content from an application within seconds from when the application became non-compliant.

One suitable evaluation engine is capable of handling analysis of terabytes of data on an hourly basis. One suitable evaluation engine can analyse up to 500,000 applications within 5 to 10 minutes and report any applications found in violation of any of the organization's policies.

One of skill informed by the teachings of the present disclosure will acknowledge that embodiments may be selected and configured to provide various technical benefits. For example, responding 808 to the access request based on both the compliance status 304 and the authorization status 306 provides finer-grained access control than relying on either one alone. This helps prevent unwanted access by a new, unknown, or malicious application based merely on possession of a user credential, for example.

In a given implementation, responding 808 to the access request based on both the compliance status 304 and the authorization status 306 may also leverage 906 existing infrastructures. For example, sensitivity labels may serve as authorization requirements 314, and service principal roles may be a source of compliance criteria 308.

These example scenarios are illustrative, not comprehensive. One of skill informed by the teachings herein will recognize that many other scenarios and many other variations are also taught. In particular, different embodiments or configurations may vary as to the number or precise requirements of compliance criteria 308 or authorization requirements 314, for example, and yet still be within the scope of the application resource access control functionality 204 teachings presented in this disclosure.

Other system embodiments are also described herein, either directly or derivable as system versions of described processes or configured media, duly informed by the extensive discussion herein of computing hardware.

Although specific application resource access control architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations of a policy 132, application attribute 402, authorization credential 312, access request 210, or authorization requirement 314, as well as different technical features, aspects, security controls, mechanisms, decision criteria, expressions, hierarchies, operational sequences, environment or system characteristics, or other functionality 204 teachings noted herein, and may otherwise depart from the particular illustrative examples provided.

Processes (a.k.a. Methods)

Figure 9:
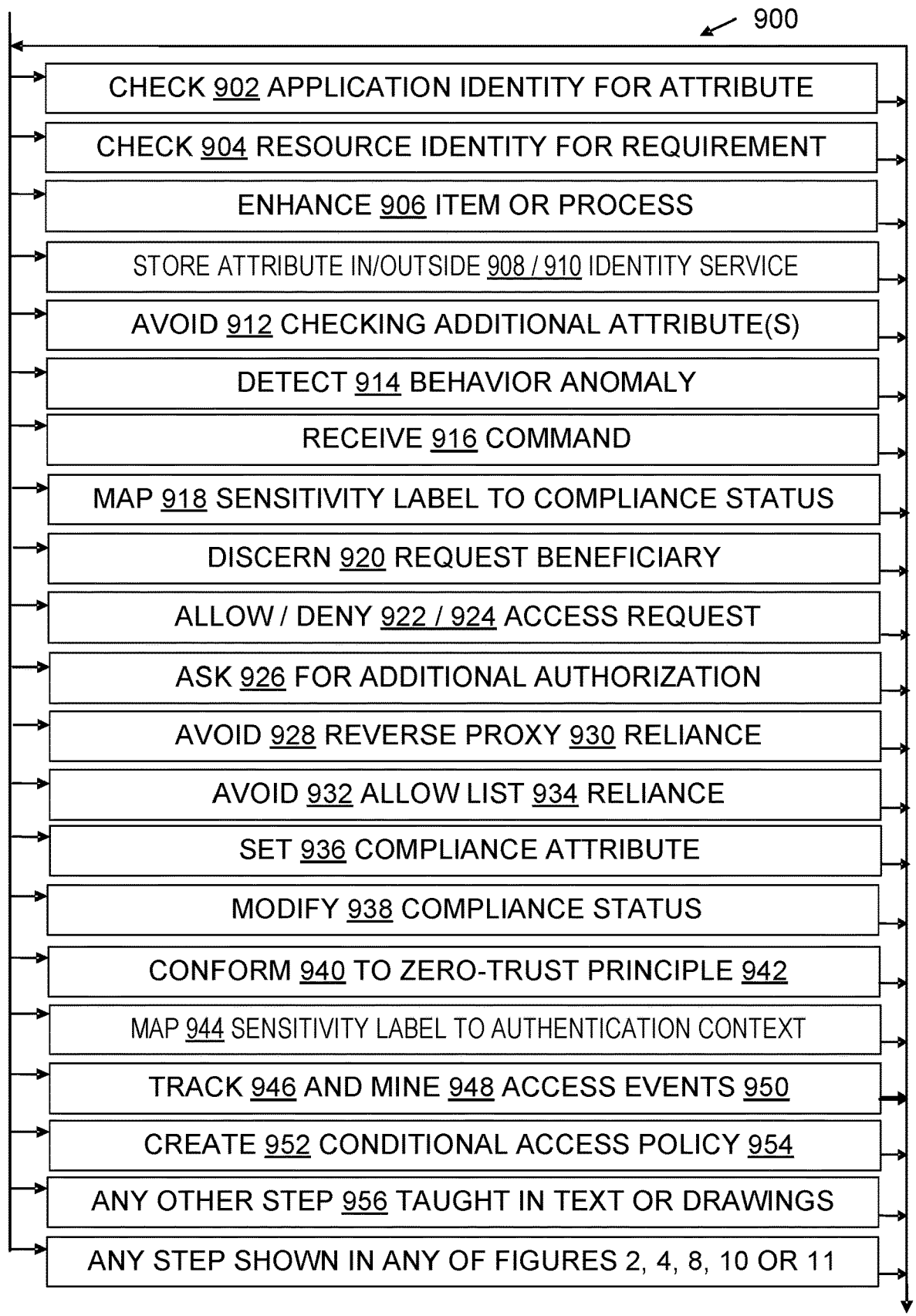
FIG. 9 is a second flowchart further illustrating steps in some application resource access control methods, incorporating steps shown in any of FIG. 2, 4, 8, 10, or 11.

Methods (which may also be referred to as "processes" in the legal sense of that word) are illustrated in various ways herein, both in text and in drawing figures. FIG. 8 illustrates a family of methods 800 that may be performed or assisted by an enhanced system, such as system 202 or another application resource access control functionality enhanced system as taught herein. FIGS. 2, 4, 10, and 11 show several application resource access control architectures with implicit or explicit actions, e.g., steps for collecting data, transferring data, storing data, and otherwise processing data to solve technical challenges discussed herein. FIG. 9 includes some refinements, supplements, or contextual actions for steps illustrated by FIGS. 2, 4, 8, 10, and 11, and FIG. 9 incorporates the steps of FIGS. 2, 4, 8, 10, and 11 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as a publisher name 622. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 8 and 9. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method 900 for controlling access by an application 130 to a resource 122, the method performed (executed) by a computing system 202, the method including: noting 802 (e.g., receiving or monitoring or getting notice of) a request from the application to access the resource; determining 804 a compliance status 304 of the application with respect to one or more compliance criteria of an access control policy; ascertaining 806 an authorization status 306 of the request with respect to an authorization credential of the request and an authorization requirement of the resource; and responding 808 to the request based on the compliance status and also based on the authorization status.

One benefit of some embodiments is finer granularity of access control. For example, applications X and Y may each possess a user token signifying authority to access data that bears a confidential-research sensitivity label, but access to that data could be allowed to X and denied to Y based on application compliance status differences. Moreover, the compliance status difference may have arisen dynamically. For instance, it could be that X and Y were both previously compliant and able to access any confidential-research data, but then Y's compliance was automatically revoked after discovery of an attempt by Y to communicate with a suspect IP address.

More generally, some embodiments recognize and execute on various reasons to modify an app's compliance status. In some embodiments, the method includes modifying 938 the compliance status of the application in response to at least one of the following: detecting 914 an anomaly 604 in a behavior 602 of the application (e.g., revoke compliance after app unexpectedly downloaded a thousand files); a command 610 received via a user interface 124 (e.g., admin says change the compliance status); a change 612 in one or more of the compliance criteria 308 (e.g., a change in which app publishers 622 are trusted, or which are suspect); or a change 614 in an attribute 402 of an application identity representation 502 of the application (e.g., app attribute updated to note renewal of app certificate 626).

In some embodiments, compliance status is Boolean, in the sense that an application is either compliant or else it is not, and those are the only possible compliance status possibilities recognized in the embodiment. The two available Boolean 608 values may be named variously, e.g., true/false, trusted/untrusted, compliant/noncompliant, and so on, but only two compliance status values are recognized.

In other embodiments, compliance status is not limited to two values. For example, a non-Boolean 606 compliance status could include at least three values: one value indicating the application is compliant, another value indicating the application is noncompliant, and a third value indicating an indeterminate or unknown or pending status, e.g., under-review or probationary status. However, compliance status 304 is not necessarily limited to an enumerated set of values. In some embodiments, a compliance status value is a numeric score, e.g., in the range from zero to ten, or the range from zero to one hundred, with greater values indicating greater compliance.

In some embodiments, the method includes mapping 918 resource sensitivity labels 616 to compliance status values 304. For example, a non-Boolean 606 compliance status could correspond to sensitivity levels 616 such that low compliance apps can only access public data, medium compliance apps can access public data or non-financial data, and high compliance apps can access any data. Other embodiments may use different sensitivity levels 616.

As noted in FIG. 4, in some embodiments an access request has a beneficiary 404. The beneficiary may be a user 104, or it may be the app 130 that is making the request, or it may be another app 130, for example. An access request response (e.g., to allow access or to deny access) may depend on whether the app is asking for access to the resource on behalf of a user or asking on behalf of the app itself.

In some embodiments, the method includes discerning 920 whether the application requests access to the resource on behalf of a user or on behalf of the application itself, and allowing 922 or denying 924 the request is based on the compliance status, on the authorization status, and on a result of the discerning 920. For example, an authorized request by a compliant app on behalf of the app itself may be granted 922, whereas an authorized request by the same compliant app on behalf of an unspecified user (or any user) may be denied 924, to prevent certain malicious actions by appropriated apps.

In some embodiments, the request 210 is a user-beneficiary request in which the application requests access to the resource on behalf of a user 104, the method allows or denies the user-beneficiary request, and the method also allows or denies an application-beneficiary request 210 in which the application requests access to the resource on behalf of the application itself. In this way, all access requests by an app can be treated uniformly with respect to compliance and authorization.

In some embodiments, responding 808 to the request includes asking 926 for additional authorization before granting access or denying access. For example, if the compliance status is consistent with allowing access but the authorization status is not, then instead of denying access an embodiment may offer the requesting application an opportunity to obtain or present a different authorization credential. In some ticket-based access embodiments, an application which has a preliminary ticket may be prompted to present a more specific ticket. In some embodiments, if access is initially denied then an application may request an additional ticket or token or other credential from the identity service, and may then gain access to the resource if that request to the identity service is granted.

In some embodiments, responding 808 to the request includes denying 924 access when the access control policy specifies access denial based on the compliance status even though the authorization status is consistent with allowing access. For instance, this may prevent an app with no certification from downloading confidential files using a consent token of a user.

In some embodiments, responding 808 to the request includes denying 924 access based on the authorization status even though the compliance status is consistent with allowing access. This may prevent an app from abusing its compliance by accessing sensitive resources that are outside the normal or expected range of resources for that app. Full compliance with all policy criteria 308 does not necessarily permit the app to access any and every resource without some further showing of authorization.

In some embodiments, responding 808 to the request based on the compliance status and also based on the authorization status is performed by at least one of the following resources 122: a web-based collaborative platform 702 (e.g., a Microsoft SharePoint® platform or similar); a document management and storage system 708 (e.g., a Microsoft SharePoint® system or similar); a hosted messaging solution 714 (e.g., a Microsoft Exchange® solution or similar); a workplace chat and videoconferencing platform 722 (e.g., a Microsoft Teams® platform or similar); or a software-as-a-service 728 (e.g., a Microsoft Office 365® service or similar) (marks of Microsoft Corporation).

In some embodiments, the method provides access control which is free 928 of reliance on reverse proxy 930 usage.

This avoidance of reliance on a proxy distinguishes such embodiments, e.g., from cloud access security broker architectures that use a proxy to monitor communications and then allow or disallow access. Resources such as platforms 702, 722, systems 708, solutions 714, and services 728 can be enhanced 906 to check 804, 806 both compliance status 304 and authorization status 306 themselves, and then allow 922 or deny 924 access based on those statuses 304 and 306, so no proxy is needed.

In some embodiments, the compliance criteria 308 rely on at least one of the following: an application registration 618 age 620; an application publisher 622 identification 624; or an application identity 406 certification 624. For example, a compliance criterion 308 may specify that an application 130 have an application registration age of at least thirty days and also have a valid certificate associating the application's identity with a publisher who is not on a list of publishers 622 that are suspect or known to be malicious or compromised.

In some embodiments, the method conforms 940 with a zero-trust principle 942 by verifying 804 the application compliance status in response to the access request before granting access, as opposed to relying on an allow list 934 of applications which are treated as compliant.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such access control software 302, access requests 210 and responses 212, compliance criteria 308, compliance status data structures 304, authorization status data structures 305, and compliance classifiers 316, in the form of data 118 and instructions 116, read from a removable storage medium 114 and/or another source such as a network connection, to form a configured storage medium. The configured storage medium 112 is capable of causing a computer system 102 to perform technical process steps for application resource access control (i.e., controlling access by applications 130 to resources 122), as disclosed herein. The Figures thus help illustrate configured storage media embodiments and process (a.k.a. method) embodiments, as well as system and process embodiments. In particular, any of the process steps illustrated in FIG. 2, 4, 8, 9, 10, or 11, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method 900 for controlling access by an application to a resource in a cloud. This method includes: noting 802 a request from the application to access the resource in the cloud; determining 804 a compliance status 304 of the application with respect to one or more compliance criteria of an access control policy; ascertaining 806 an authorization status 306 of the request with respect to an authorization credential of the request and an authorization requirement of the resource; and responding 808 to the request based on the compliance status and also based on the authorization status.

In some embodiments, determining 804 the compliance status of the application includes checking 902 an application identity representation 502 in an identity service for a compliance attribute.

In some embodiments, ascertaining 806 the authorization status of the request includes checking 904 a resource identity representation 504 in an identity service for the authorization requirement.

In some embodiments, the compliance status 304 values are not limited to Boolean values. In other embodiments, the compliance status 304 values are limited to Boolean values.

In some embodiments, the method provides access control 900 which is free 928 of reliance on a cloud security proxy 930.

Additional Observations

Additional support for the discussion of application resource access control functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some access control architectures rely on a proxy solution, in the sense that every request between a user and a service is routed through another layer (a proxy), allowing the proxy to block access to an unsanctioned app for delegated flow. In this case, there may well be a user involved, and the user is denied access to a resource as the app tries to access the resource on behalf of the user.

Some embodiments taught herein provide or employ a different approach, in which a compliant app doesn't need a user's credential to run in a cloud. Examples of apps 130 that may be made compliant include workflow apps, crawler apps, an antivirus service, web apps which are not user-controlled, and many more.

Some embodiments control access to sensitive content from cloud applications. One of skill will acknowledge that there could be hundreds or even thousands of cloud applications 130 installed and used by an organization to access and modify digital assets 122 such as email 718, documents 712, sites 706, etc. Some of these assets are extremely sensitive and considered high value assets (HVAs), so access to them via applications should be guarded, e.g., by following 940 zero-trust principles 942.

Some access control approaches seek to prevent access to HVAs by unauthorized users. Some seek to track and prevent access by authorized users using an untrusted IP address or using an unmanaged device. However, this does not serve adequately as a mechanism for administrators to prevent access to HVAs via non-compliant cloud applications. Once an administrator provides consent to an app 130 and provides a basic scope of read access, then that application may be allowed to read any files or assets.

Some embodiments herein provide a mechanism to define and enforce access policies 132 so that admins can define conditions 308 against cloud applications. Based on these conditions the cloud applications may be given specific levels of clearance 308 to access assets 122 of various sensitivity. In one example, an application marked as "low trust" has clearance to access assets of sensitivity 616

"General" or below, and is not able to access assets marked as "Confidential" or above. More generally, an admin can tag or label assets, e.g., via Microsoft Information Protection™ labels or other sensitivity labels 616, and also set policy requirements 308 for apps which may reference these labels 616 or be independent of any labels (mark of Microsoft Corporation). This allows the administrator to manage and control access of apps in a granular manner for sites, list, libraries, files, and other resources 122.

Some embodiments provide one or more of the technical advantages noted in the following paragraphs or elsewhere in this disclosure.

Some embodiments provide administrators the ability to declaratively classify all service principals 1002, 130 in their tenancy into compliant or non-compliant applications. Some embodiments provide a rich set of attributes 402 on service principals including static or metadata, as well as behavioral data using which the classification of service principals can be declared. Some embodiments execute a process 316 that's constantly evaluating the classification of the apps based on the declaration 132 by the administrator. Although service principals are called out in this and other examples, the teachings herein may also be applied to other kinds of applications 130.

For digital asset classification, some embodiments leverage 906 a classification capability using Microsoft Information Protection™ labels or other sensitivity labels 616. Some embodiments also leverage a Microsoft compliance center ability or the like to establish an innovative authentication context 1006 for each of these sensitivity labels.

In some embodiments, services are enhanced as taught herein. For example, in some embodiments when a service principal makes a call (e.g., to a Microsoft Graph™ API) to access a digital asset that is tagged with a sensitivity label, the enhanced service 702, 708, 714, 722, or 728 checks 902 for presence or absence of the authentication context 1006, based on which the access is allowed or denied.

In some embodiments, a Conditional Access Policy is enhanced 906 to apply to Service Principals or other apps 130 to issue the authentication context 1006 based on the app classification.

Some embodiments provide granular access control as taught herein for apps 130 that are accessing digital assets using app-only permissions as well as apps 130 that are accessing digital assets using delegated permissions.

Beyond providing access control capabilities, tracking 946 events 950 in a SIEM or otherwise in an embodiment can also provide access event data 118, 950, which can be mined 948 for insights into apps that are accessing sensitive content. This may reveal, for example a contrast between expected app behavior and actual app behavior, which is noteworthy even when the app is not behaving maliciously.

As further illustration, consider a scenario involving an application regulatory governance service 1020, e.g., the Microsoft App Governance™ service, sometimes also referred to as a regulatory compliance service 1020. App Governance (AppG) technology provides an app protection and governance solution to reduce a customer's security and regulatory compliance risk. In this example scenario, a regulatory compliance administrator can set proactive app policies to help ensure that sensitive data of the organization is protected from non-compliant applications. For example, settings 308 may be chosen to prevent apps which are not certified from accessing emails and files which are marked as confidential. In operation, sensitivity labels may be used to define sensitivity of data or to define sensitivity of a location where data is residing, or both. An auth context feature of a conditional access policy is adapted.

In this example, an admin user creates a policy 132 in an AppG portal to help protect high value assets in an organization. Via the portal, the admin chooses applications 130 for which this policy will apply, and chooses labels 616 for restricted access to apply to sites 706, e.g., SharePoint® sites (mark of Microsoft Corporation). As shown in FIGS. 10 and 11, every app before calling a service 702, 708, etc. via a Microsoft Graph™ API or the like gets a token 1004 from Azure® Active Directory® or another identity service 310. Then the called API is given a source appID, a target appID, and a target resource (e.g., SharePoint® site). The called API supports a hooking mechanism, e.g., the MSGraph™ code can callback a function when the actual call is in progress (marks of Microsoft Corporation).

In one policy administration flow, an administrator creates one or more access policies 132 to control access to sensitive content 122. More precisely, the administrator interacts with the system 202 and the system 202 executes instructions which create one or more policies 132 to control access to sensitive content 122 (steps nominally ascribed to a person herein will be understood to actually be performed by a system 202 under user interaction via an interface 124). This example policy creation flow allows the administrator to author the policy, in the sense that the administrator determines what items are represented in the digital policy.

One component of policy definition authored by the admin in this policy creation flow may include a human-readable name and a human-readable description of the access policy 132. Another policy 132 component is the condition(s) or criteria 308 for a cloud application to be considered non-compliant (e.g., "app registration age is less than 15 days" or "app is not publisher verified") or the condition(s) or criteria 308 for a cloud application to be considered compliant (e.g., "app registration age is greater than 29 days and app is publisher verified"), or both. Another policy 132 component in this example is a set of sensitivity labels 616 that indicate access should be denied to applications that are found to be non-compliant (or not found to be compliant), e.g., "Confidential" and "Highly Confidential" labels.

In some situations, requiring compliance for access is not always the same as avoiding non-compliance. An app 130 that has not been classified (e.g., one with an unknown or missing compliance status) 304 may be allowed access when access involves avoiding non-compliance but the same non-classified app may be denied access when access involves requiring compliance.

Continuing the example policy creation flow, after the policy 132 criteria 308 are specified, various resource-related services may be configured. A custom security attribute may be defined. Sensitivity labels may be mapped to an auth context. A conditional access policy data structure may be created. These various access control artifacts created are saved in memory 112, e.g., on disk, incrementally or together.

As to the custom security attribute, in some embodiments an identity service 310 exposes an API to define custom security attributes 1016 for any attribute in the identity service, including service principals 1002 or other digital items which represent or otherwise correspond to the cloud applications 130 whose access will be controlled. A policy administration process may call this API and create a new custom attribute 1016, 506 named as <Policy Name> that can take the following values {"confidential", "nonconfidential"}, for example.

As to mapping 944 sensitivity labels 616 to an auth context 1006, some embodiments check whether the labels 616 selected for protection already have authentication contexts 1006 created and mapped for them. An implementation could use the Microsoft Graph™ API with Microsoft Information Protection™ labels to achieve this. This mapping may be used to set up the conditional access policy noted herein. This mapping may also be used by the workloads 702, 708, 714, 722, and 728, for instance, to help control access to sensitive content via workload enforcement, as discussed further herein.

As to conditional access policy creation, some embodiments use identity service 310 APIs to create 952 a conditional access policy 954 along the following lines: If the service principal has custom attribute <policy Name> with value "nonconfidential" then "deny" granting auth contexts mapped to the sensitivity labels selected.

With regard to app classification and token grants, in some embodiments an application governance functionality has an app classification service that continuously scans the service principals (and in a variation, scans all applications 130) in a cloud tenant and applies classification rules as defined by the policy definitions 308 that are saved as part of policy authoring flows. If the application condition defined in the policy with <policy name> is true, then the app classification service sets the value of the custom attribute 506 to be "noncompliant". If the condition is evaluated to be false, then the app classification service clears out any previously set values. After this, under a conditional access policy, whenever the application requests an access token (used, e.g., to access any service 728 asset 122), it receives tokens with auth context if-and-only-if the application is not classified as "noncompliant".

As to workload enforcement, in some embodiments an endpoint such as a platform 702 or a system 708 reads a verified sensitivity-labels-to-auth-context mapping 944. This helps ensure that any request to access an asset that is labelled with a sensitivity label is denied if it lacks the corresponding auth context 1006 in the access token 1004. If the auth context is not present, access is denied. Since an application that is classified as "nonconfidential" is unable to get an access token with the required auth context, that application is denied access to the sensitive content in this example.

Some embodiments determine quite efficiently whether an application 130 can access labeled sensitive content (e.g., a file 122 marked confidential). Rather than utilizing larger amounts of memory and CPU to store and check a separate identity authentication conditional access attribute (e.g., an Azure® Active Directory® custom conditional access attribute) for each sensitivity label 616 or each sensitive content 118, 122 as shown in FIG. 10, some embodiments instead utilize less memory 112 and CPU 110 as shown in FIG. 11 to perform a distributed app attribute condition evaluation 1022 (e.g., a sensitivity label policy check) and map 936 the result to a single identity authentication custom attribute 506 per policy (marks of Microsoft Corporation). The conditional access policy 132, 954 is defined using only a simple condition involving the single Boolean attribute 506 for the app 130.

This FIG. 11 architecture enables faster identity authentication and uses fewer identity authentication tokens (e.g., via Azure® Active Directory® calls). This FIG. 11 architecture is a more efficient approach to protecting sensitive labeled data files, than a granular conditional access sensitivity label 616 on platform 702 site collections, and rather than relying solely on per-app authorizations which may prevent an application 130 from accessing any data files at all.

FIGS. 10 and 11 illustrate particular approaches which may be used in embodiments but are not requirements across all embodiments. As explained herein, the FIG. 11 approach provides an efficiency improvement over the FIG. 10 approach.

In some embodiments, a service principal has several attributes that are stored and computed in an application governance product, which are referred to here as AppG attributes. To leverage 906 conditional access policies, one approach is to define the same attributes in an identity service custom security attributes system and then sync the AppG attributes into a custom attributes store 1010. Enhancements 906 which extend conditional access policies to service principals and allow custom attribute-based conditions for service principals permit definition of the condition on the service principle in the conditional access policy using the custom security attributes. All the attributes defined in AppG are available to be used to define the conditional access policy. However, this approach (per FIG. 10) results in usage of much higher memory and CPU at conditional policy evaluation time which needs to be performed at every token request time.

As shown, a token request 210 is sent by the service principal 1002, 130 to the identity service 310. AppG attributes are synced by the regulatory compliance service 1020 as custom attributes 1016 in an attribute cache 1010 of the identity service 310. A conditional access policy 954 from a policy store 1018 is cached in an identity service cache 1014 for the tenant 1012. Attribute evaluation 1008 is done in the identity service, e.g., in response to the token request, and if all access requirements are met then the identity service sends a token 1004 to the service principal, with a valid auth context 1006 to permit access as requested.

In this less efficient approach, when the application (service principal) requests a token, the conditional access policy evaluation kicks in. The policy evaluation engine may require that both the policy definitions and the custom security attributes be in memory to reduce latency, so they would be (pre)fetched and cached for efficiency. Because of the number of custom attributes 1016, the cache 1010 size may be very high. Because of the number of attributes involved in the conditions defined in the policy, the condition evaluation may also be quite expensive in CPU cycles.

FIG. 11 shows a more efficient approach, which has reduced memory and CPU requirements at policy evaluation time for the token service, in comparison to the FIG. 10 approach. This FIG. 11 approach does not sync all app attributes from AppG into the identity service custom attributes store. Instead, this approach performs the app attribute condition evaluation 1022 in a separate service. In this FIG. 11 approach a single custom attribute 506 is defined per policy 132 and the outcome of the app-attribute condition evaluation is synced into this custom attribute 506 in the cache 1010. The conditional access policy is defined using only a simple condition involving the single Boolean compliance attribute for the app.

In general, however, embodiments include ones in which AppG or another separate service does app attribute condition evaluation, and also include ones where that evaluation is done inside Active Directory® or another identity service 310 (mark of Microsoft Corporation). Likewise, the AppG or similar attributes may be stored only in the separate service, or they may be stored in an identity service 310 custom attributes store.

In some situations, the FIG. 11 approach provides one or more of the following efficiencies. The memory used for custom attribute storage is lowered. It may be Boolean attribute instead of a dozen or more attributes (strings, integers, decimals, enums, etc.). The memory requirement in the conditional access policy evaluation module is similarly lowered. Only one Boolean per policy is cached instead of a dozen or more richer (and hence larger) attributes. The CPU requirement in a conditional access policy evaluation module is lowered. The conditional policy definition also uses only a is lowered condition on this one attribute, so the evaluation takes significantly less CPU cycles, as compared to evaluating a dozen or more attributes. The network usage (number of bits transmitted) to sync the custom attributes from AppG to identity service custom attributes is also reduced, both because of the lower number of attributes to be synced as well as the ability to sync only when the condition has changed as opposed to anytime any of the raw attributes have changed. Another advantage of this solution is extensibility. Many new attributes that could be defined in AppG without adding new custom attributes in the identity service for service principals.

Some embodiments provide or utilize systems, processes, or apparatus to perform access control with particular technical benefits.

For example, determining 804 a compliance status of the application with respect to one or more application compliance criteria of an access control policy, and allowing or denying an access request based on the compliance status 304 beneficially provides control over access attempts by applications which may have permissions but nonetheless pose unwanted security risks to sensitive data.

As another example, allowing or denying an access request based on the application compliance status 304 and also on an authorization status 306 of the request with respect to an authorization credential of the request provides-grained access control beyond what is provided by data sensitivity labels alone.

As another example, modifying 938 the compliance status of the application in response to detecting an anomaly in a behavior of the application helps quickly prevent additional damage to sensitive data when an application behaves suspiciously.

As another example, mapping 918 resource sensitivity labels to compliance status values allows applications to be arranged in groups or in levels according to how much they are trusted or what data they are trusted to access.

Unlike an alternative access control approach that relies on encryption of sensitive content, embodiments described herein need not involve complex key management, or expensive on-the-fly decryption. Moreover, approaches described herein work well with a wide variety of resources, whereas the efficiency and usability of encryption varies widely depending on the kind of data encrypted.

Preliminary Description

A preliminary description of application resource access control embodiments is provided below, updated to include reference numbers.

Some embodiments provide or utilize resource access control 206 that is based on application ("app") 130 compliance plus permissions (authorization, e.g., as a token). Some embodiments are not limited to systems that have Microsoft Active Directory®, Azure® Active Directory® (marks of Microsoft Corporation) or another identity service directory 310.

Some embodiments conform with the data flow diagram shown in FIG. 4. In operation, an application 130 is assigned a compliance status 304 which is based on the application's attributes 402 and on compliance criteria 308 from a policy 132. The application makes a request 210 for access to a resource 122. The request has an authorization status 306 which is based on an authorization credential 312 in the request and an authorization requirement 314 of the resource. The application is allowed 922 or denied 924 access 208 to the resource based on both the compliance status and the authorization status.

Some examples of an application 130 include service principals 1002, services, microservices, software-as-a-service 728, and third-party apps. As used herein, "include" means comprises.

Some examples of an access control policy 132 include a Conditional Access Policy 954 or other security policy.

Access 208 includes read, write, modify, move, delete, etc.

Application compliance criteria 308 are criteria used to determine compliance status 304. Compliance criteria may be positive or negative, and may be list-based or not, e.g., "app registration age is at least 15 days" is a positive not-list-based criterion, "app is not on list of suspect publishers" is a negative list-based criterion, etc. Compliance status 304 may be Boolean (compliant/non-compliant) or numeric (e.g., compliance score of 85 out of 100) or categorical (e.g., unknown/pending/low/medium/high), for example.

Some examples of a resource 122 include a file 712, email 718, attachment 720, note 724, calendar 726, chat 710, site 706, endpoint 704, SharePoint® offering 702 or 708, Exchange® offering 714, Teams® offering 722, etc. (marks of Microsoft Corporation). Thus, a resource 122 may be an individual artifact such as a file or be a service such as an email service.

In some embodiments, a system 202 is configured to perform resource access control 206, the system including: a digital memory 112; and a processor 110 in operable communication with the digital memory, the processor configured to perform resource access control including: noting 802 a request 210 from an application 130 to access 208 a resource 122, determining 804 a compliance status 304 of the application with respect to one or more application compliance criteria 308 of an access control policy 132, ascertaining 806 an authorization status 306 of the request with respect to an authorization credential 312 of the request and an authorization requirement 314 of the resource, and allowing 922 or denying 924 the request based on the compliance status and also on the authorization status.

Some embodiments store 1010 a compliance status as a tag 506 (a.k.a. an attribute 402) in an identity service 310 such as an Active Directory® service 310.

An identity representation 502 or 504 of an item (e.g., the application 130) is any data structure that represents the item in the identity service 310, e.g., an object in an Active Directory® database, or a record in an identity service provider database.

In some embodiments, a system 202 further includes an identity service 310 containing an identity representation 502 of the application, and determining 804 the compliance status of the application includes checking 902 the application identity representation for a compliance attribute 506.

Some embodiments include or utilize an app compliance classifier 316, e.g., a machine learning classifier that classifies 804 new apps or periodically revisits apps, updating 804 their compliance status as needed to reflect changes.

In some embodiments, a system 202 further includes an application compliance classifier 316 configured to determine 804 a respective compliance status 304 of multiple respective applications 130 with respect to the compliance criteria 308 of the access control policy 132.

Some embodiments store an authorization requirement 314 on a resource 122 as a tag (a.k.a. attribute 402, 504) in an identity service 310. In particular, the authorization requirement tag could be an authentication context tag 1006.

In some embodiments, a system 202 further includes an identity service 310 containing an identity representation 504 of the resource, and ascertaining 806 the authorization status of the request includes checking 904 the resource identity representation for the authorization requirement.

Some embodiments sync all app attributes from an AppG-type service into an identity service custom attributes store 1010. Others do not, but instead perform an app attribute condition evaluation 1022 in a separate service. Some define a single identity service custom attribute 506 per policy 132 and the outcome of the app-attribute condition evaluation is synced into this attribute 506. In some, a conditional access policy 954 is defined using only a simple condition involving the single Boolean attribute 506 for the app 130. Thus, in some embodiments AppG or another separate service does app attribute condition evaluation 804, and in some embodiments that evaluation is done inside Active Directory® software or another identity service. Likewise, the AppG or similar attributes 1016 may be stored only in the separate service, or they may be stored in an Active Directory® custom attributes store 1010 or other identity service 310 store 1010.

In some embodiments, a system 202 further includes an identity service 310 containing an identity representation 502 of the application having a compliance attribute 506, the system also includes a set of additional application attributes 402 which are not stored in the identity service 310, the system is configured to set 936 the compliance attribute based at least in part on the additional application attributes, and determining 804 the compliance status in response to the access request 210 includes checking 902 the compliance attribute without also checking the additional application attributes.

Some embodiments include or utilize a method 900 for controlling access by an application to a resource, the method performed by a computing system, the method comprising: receiving or otherwise noting 802 a request from the application to access the resource; determining 804 a compliance status of the application with respect to one or more compliance criteria of an access control policy; ascertaining 806 an authorization status of the request with respect to an authorization credential of the request and an authorization requirement of the resource; and allowing 922 or denying 924 the request based on the compliance status and the authorization status. Some embodiments include or utilize a computer-readable storage device 112 or 114 configured with data 118 and instructions 116 which upon execution by a processor of a computing system perform the foregoing method or another method 900 for controlling app access to sensitive data.

Some embodiments recognize or respond to one or more of various reasons to modify 938 an app's compliance status. In some embodiments, a method further includes modifying the compliance status of the application in response to at least one of the following: detecting 914 an anomaly in a behavior of the application (e.g., an app unexpectedly downloaded 10K files); a command 610 received 916 via a user interface 124 (e.g., an admin says change the compliance status); a change 612 in one or more of the compliance criteria 308 (e.g., change 612 as to which app publishers are trusted); or a change 614 in an attribute 402 of an application identity representation of the application (e.g., a change 614 in app attribute in the identity directory 310).

Some embodiments utilize a non-Boolean compliance status 304. For instance, compliance status may be mapped 918 to sensitivity level 616, e.g., low compliance apps can only access public data, medium compliance apps can access public data or non-financial data, and high compliance apps can access any data. In some embodiments the method includes mapping 918 resource sensitivity labels 616 to compliance status values 304.

Some embodiments utilize a set of compliance status values 304 that include a non-Boolean such as a monitored compliance status or pending compliance status or probationary compliance status. More generally, an embodiment may utilize 918 non-Boolean compliance status values 304 to group apps according to their compliance similarities or differences.

Some embodiments recognize or respond to a possibility that an access request response 212 (to allow access or to deny access) may depend on whether the app is asking on behalf of a user or asking on behalf of the app itself. In some embodiments the method includes discerning 920 whether the application requests access to the resource on behalf of a user or on behalf of the application itself, and allowing 922 or denying 924 the request is based on the compliance status, on the authorization status, and on a result of the discerning.

Other embodiments may be formed by mixing and matching aspects of the present disclosure in various ways with one another or with known technologies.

Technical Character

The technical character of embodiments described herein will be apparent to one of ordinary skill in the art, and will also be apparent in several ways to a wide range of attentive readers. Some embodiments address technical activities such as communicating 902, 904 908, 936 electronically with an identity service 310, computationally determining 804 a digital compliance status 304, computationally ascertaining 806 a digital authorization status 306, allowing 922 or denying 924 access to a resource 122 in a computing system 102, or calling an API, which are each an activity deeply rooted in computing technology. Some of the technical mechanisms discussed include, e.g., access control software 302, compliance classifiers 316, enhanced resources 702, 708, 714, 722, and 728, and proxies 930. Some of the technical effects discussed include, e.g., finer-grained access control 206 than is possible using authorization credentials 312 alone, grouping of applications 130 according to the sensitivity of data they may properly access 208, improved efficiency of memory 112 and processor 110 usage in some embodiments that include or utilize an identity service 310, and freedom 928 from a scale-constraining reliance on proxies 930 during access control 206 of applications 130 in a cloud 134. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations, as discussed at various points in this disclosure.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems. One example is the technical problem of how to scale asset control efficiently to handle many (thousands, perhaps even up to millions) of applications 130 from a wide variety of sources, which is addressed, e.g., by using an identity service 310 and enhanced resources 702, 708, 714, 722, or 728, and by avoiding proxies 930. Another example is the technical problem of how to respond computationally to changes in application characteristics, which is addressed, e.g., by determining 804 compliance status on a per-request 210 basis. Yet another example is the technical problem of how to leverage existing access control tools without being limited to their capabilities, which is addressed, e.g., by using labels 616, attributes 402, and other items suitably adapted 906 as taught herein.

Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other embodiment implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
SIEM: security information and event management, or tool for the same
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device 218 or IoT device 218. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Access control operations such as noting 802 a request 210 from an application 130 to access a resource 122, determining 804 compliance status 304 based on policy criteria 308, and many other operations discussed herein, are understood to be inherently digital. A human mind cannot interface directly with a CPU or other processor, or with RAM or other digital storage, to read and write the necessary data to perform the application resource access control steps 900 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor". More generally, "one or more" means "at least one".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, allowing, ascertaining, asking, authorizing, checking, complying, conforming, controlling, creating, denying, detecting, determining, discerning, labeling, mapping, mining, modifying, noting, receiving, requesting, responding, setting, storing, tracking (and accesses, accessed, allows, allowed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202, such as a developer or programmer; refers to a human or a human's online identity unless otherwise stated 106 peripheral device 108 network generally, including, e.g., LANs, WANs, software-defined networks, clouds, and other wired or wireless networks 110 processor; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102

120 kernel(s), e.g., operating system(s), BIOS, UEFI, device drivers 122 resource; digital or computational or both 124 user interface; hardware and software 126 display screens, also referred to as "displays"

128 computing hardware not otherwise associated with a reference number 106, 108, 110, 112, 114

130 applications, e.g., version control systems, cybersecurity tools, software development tools, office productivity tools, social media tools, diagnostics, browsers, games, email and other communication tools, commands, service principals, and so on 132 access control policy; digital or computational or both 134 cloud, cloud computing environment 202 system 102 enhanced with application resource access control functionality 204

204 functionality for application resource access control; e.g., software or specialized hardware which performs or is configured to perform at least steps 804, 806, and 808, or any software or hardware which performs or is configured to perform a method 900 or a computational application resource access control activity first disclosed herein 206 computational item which controls access 208, or computational activity of controlling access 208, e.g., by allowing access, denying access, imposing one or more additional conditions on access, or monitoring access for a security, privacy, performance, regulatory, or testing purpose 208 access to a resource 122; see definition of "access" above and examples herein 210 access request, e.g., a digital artifact or computational activity representing or including a request for access 208

212 access request response, a digital artifact or computational activity representing or including a response to a request for access 208

214 access controlled system; a system 102 whose applications 130 are subject to access control 206, or a system 102 whose resources are subject to access control 206, or a combination thereof; an enhanced system 202 may be or include an access controlled system, or the enhanced system 202 may control access to an access controlled system that is external to the enhanced system 202

302 application resource access control software, e.g., software which upon execution performs at least steps 804, 806 and 808

304 compliance status; depending on context, refers to compliance status data structures generally or compliance status values generally, or to particular compliance status data structures or particular compliance status values; digital

306 authorization status; depending on context, refers to authorization status data structures generally or authorization status values generally, or to particular authorization status data structures or particular authorization status values; digital

308 application compliance criteria (one or more); also referred to as compliance condition; digital

310 identity service or component thereof, e.g., identity directory; computational

312 authorization credential; e.g., certificate or token representing authorization; digital

314 authorization requirement; e.g., representation of clearance or credential or permission required for a particular kind of access or for access generally; digital

316 compliance classifier; also referred to as compliance evaluation engine 316; computational

318 interface generally; computational

402 application attribute or resource attribute; also referred to as tag or property; digital

404 beneficiary of access request, e.g., application itself or user of application; as represented digitally in a system 102

406 application identity as represented digitally in a system 102

502 representation of an application in an identity service; digital

504 representation of a resource in an identity service; digital

506 attribute 402 which represents compliance status 304 of an application 130 with respect to a set of one or more policy criteria 308

508 scalability characteristic of a given functionality in a system 102

602 behavior of an application as represented digitally in a system 102

604 anomaly in behavior 602 as represented digitally in a system 102

606 non-Boolean value; a value from a set of more than two values; digital

608 Boolean value; a value from a set of exactly two values; digital

610 command, e.g., from a user as represented digitally in a system 102

612 change in one or more criteria 308 as represented digitally in a system 102

614 change in one or more attributes 402 as represented digitally in a system 102

616 digital sensitivity label or computational activity of sensitivity labeling

618 registration of an application in a system 102

620 age of a registration 618; digital

622 publisher or other source of an application in a system 102; digital

624 certificate or other verifiable ID of publisher 622 or of relationship between an application and a publisher; digital

626 digital certificate

702 web-based collaborative platform

704 endpoint, e.g., API or service interface; computational

706 website or other addressed location in a network 108

708 document management and storage system

710 chat as represented in a system 102

712 file as represented in a system 102

714 hosted messaging solution

716 application program interface (API) in a system 102

718 email as represented in a system 102

720 email attachment as represented in a system 102

722 workplace chat and videoconferencing platform

724 note as represented in a system 102

726 calendar as represented in a system 102

728 software-as-a-service; computational

730 network 108 bandwidth as represented in a system 102

732 data stream as represented in a system 102

734 communication channel as represented in a system 102

736 virtual machine; computational, digital artifact

738 storage in a system 102 or digital representation thereof

800 flowchart; 800 also refers to application resource access control methods that are illustrated by or consistent with the FIG. 8 flowchart

802 computationally note a request 210 for access by an application 130, e.g., using a SIEM or other event monitoring technology

804 computationally determine an application's compliance status with regard to a request 210

806 computationally ascertain an application's authorization status with regard to a request 210

808 computationally respond to an application's request 210

900 flowchart; 900 also refers to application resource access control methods that are illustrated by or consistent with the FIG. 9 flowchart, which incorporates the steps of FIGS. 2, 4, 8, 10, and 11

902 computationally check content of an application attribute in an identity service, or check for the presence of an application attribute in an identity service, or both

904 computationally check content of a resource attribute in an identity service, or check for the presence of a resource attribute in an identity service, or both

906 adapt or leverage or otherwise enhance an item or process by adding functionality 204

908 computationally store an attribute 402 inside an identity system, e.g., in a cache 1010

910 computationally store an attribute 402 outside an identity system, e.g., in a store 1016 or a service 1020

912 computationally avoid checking additional attributes, e.g., per operation consistent with FIG. 11

914 computationally detect an anomaly, e.g., using statistical analysis or a trained machine learning model

916 computationally receive a command in a system 102

918 computationally map between a sensitivity label and a compliance status; also refers to a map artifact resulting from such computational activity; computational, digital, or both

920 computationally discern a request beneficiary 404, e.g., by looking for use of a delegated permission 312

922 computationally allow access 208
924 computationally deny access 208
926 computationally ask for additional credentials or other authorization before allowing access 208
928 computationally avoid relying on a proxy for access control; avoiding reliance means either there is no proxy or access can be controlled without regard to activity of the proxy
930 proxy; computational
932 computationally avoid relying on an allow list for access control; avoiding reliance means either there is no allow list or access can be controlled without regard to content of the allow list
934 allow list; digital
936 computationally set a value in a compliance attribute
938 computationally modify a compliance status value
940 computationally conform with a zero-trust principle
942 a zero-trust principle as represented in a system 102, e.g., checking all variables that may determine whether to allow access in response to an access request and prior to either allowing or denying access; in a short-circuit version, access is denied if any variable indicates denial and access is allowed only if every variable indicates allowance
944 computationally map between a sensitivity label and an authentication context; also refers to a map artifact resulting from such computational activity; computational, digital, or both
946 computationally track access requests and responses, e.g., by logging events 950
948 computationally mine events 950, e.g., to determine which resources are accessed by a given application
950 computational event in a system 102; digital
952 computationally create a policy 132
954 conditional access policy; an example of a policy 132 in some Microsoft environments; digital
956 any step discussed in the present disclosure that has not been assigned some other reference numeral; 956 may thus be shown expressly as a reference numeral for various steps, and may be added as a reference numeral for various steps without thereby adding new matter to the present disclosure
1002 service principal as represented in a system 102
1004 authentication or authorization or other security token in a system 102; digital
1006 authentication context tag or authentication context in a system 102, e.g., in an identity service 310; digital
1008 attribute evaluation computational activity or functionality for performing such activity; may calculate current values of attributes, and compare attribute values to other values, for example
1010 attribute store or cache; includes memory 112; computational
1012 cloud or other network tenant as represented in a system 102; may also be referred to as a customer
1014 cache or other store holding data specific to a tenant 1012; includes memory 112
1016 custom attributes 402, e.g., business specific attributes (key-value pairs) that a customer can define and assign to identity service objects (users, service principals etc.); also refers to storage holding custom attributes
1018 cache or other store holding policy 132 or policy data 118; may be specific to a tenant 1012; includes memory 112
1020 regulatory compliance service; also referred to as governance service; computational
1022 attribute evaluation computational activity or functionality for performing such activity which is done by or controlled by service 1020; may calculate current values of attributes, and compare attribute values to other values, for example

CONCLUSION

In short, the teachings herein provide a variety of application resource access control functionalities 204 which operate in enhanced systems 202. Some embodiments automatically control 206 access 208 by applications 130 to resources 122 in a computing environment 100. An embodiment notes 802 a request 210 from an application 130 to access 208 a resource 122, determines 804 a compliance status 304 of the application 130 based on access control policy 132 compliance criteria 308, ascertains 806 an authorization status 306 of the request 210 based on an authorization credential 312 of the request 210 and an authorization requirement 314 of the resource 122, and responds 808 to the request 210 based on the compliance status 304 and also based on the authorization status 306, thereby providing fine-grained access control 206. Access 208 may also be controlled 206 based on 920 a request's beneficiary 404. An access request response 212 may allow 922 access, deny 924 access, or ask 926 for additional authorization 312. A compliance classifier 316 reduces risk by dynamically updating 804, 936 compliance status 304, 506 after compliance criteria 308 changes 612, application 130 attribute 402 changes 614, or resource 122 attribute 402 changes 614. An identity service 310 access control architecture (FIG. 11) uses a compliance attribute 506 to improve 906 efficiencies. Applications 130 may be access control grouped 918 according to resource sensitivity labels 616. Other application resource access control teachings and functionalities 204 are also described herein.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system which is configured to perform resource access control, the system comprising:
a digital memory; and
a processor in operable communication with the digital memory, the processor configured to perform resource access control without involving any reverse proxies, wherein the resource access control comprises:
noting a request from an application to access a resource,
determining a compliance status of the application with respect to one or more application compliance criteria of an access control policy at least in part by checking an application identity representation for a compliance attribute data structure of an identity service,
ascertaining an authorization status of the request with respect to an authorization credential of the request and an authorization requirement of the resource, and
responding to the request based on the compliance status and also based on the authorization status.

2. The computing system of claim 1, wherein the compliance status depends on at least one of:
an application certificate which identifies a publisher of the application;
a determination that a publisher of the application is not untrusted;
a determination that a publisher of the application is trusted, a change in which application publishers are trusted;
a registration age of the application, an application certificate renewal status, a service principal property;
an application attribute which is not stored in the identity service which stores the application identity representation;
an application publisher identification; or
a certification of an identity of the application.

3. The computing system of claim 1, wherein the system further comprises an application compliance classifier which is configured to upon execution determine a respective compliance status of multiple respective applications with respect to the compliance criteria of the access control policy.

4. The computing system of claim 1, wherein the system further comprises an identity representation of the resource, and ascertaining the authorization status of the request includes checking the resource identity representation for the authorization requirement.

5. The computing system of claim 1, wherein the system further comprises a set of additional application attributes which are not stored in the identity service, the system is configured to set the compliance attribute data structure based at least in part on the additional application attributes, and determining the compliance status in response to the access request includes checking the compliance attribute data structure without also checking the additional application attributes.

6. A method for controlling access by an application to a resource without involving any reverse proxies, the method performed by a computing system, the method comprising:
noting a request from the application to access the resource;
determining a compliance status of the application with respect to at least one compliance criterion of an access control policy at least in part by checking an application identity representation for a compliance attribute data structure of an identity service;
ascertaining an authorization status of the request with respect to an authorization credential of the request and an authorization requirement of the resource; and
responding to the request based on the compliance status and also based on the authorization status.

7. The method of claim 6, further comprising modifying the compliance status of the application in response to at least one of the following:
detecting an anomaly in a behavior of the application;
a command received via a user interface;
a change in at least one compliance criterion; or
a change in an attribute of an application identity representation of the application.

8. The method of claim 6, further comprising mapping resource sensitivity labels to compliance status values.

9. The method of claim 6, further characterized in at least one of the following ways:
the method includes discerning whether the application requests access to the resource on behalf of a user or on behalf of the application itself, and allowing or denying the request is based on the compliance status, on the authorization status, and on a result of the discerning; or
the request is a user-beneficiary request in which the application requests access to the resource on behalf of a user, the method allows or denies the user-beneficiary request, and the method also allows or denies an application-beneficiary request in which the application requests access to the resource on behalf of the application itself.

10. The method of claim 6, wherein responding to the request includes asking for additional authorization before granting access or denying access.

11. The method of claim 6, wherein responding to the request includes at least one of:
denying access when the access control policy specifies access denial based on the compliance status even though the authorization status is consistent with allowing access; or
denying access based on the authorization status even though the compliance status is consistent with allowing access.

12. The method of claim 6, wherein responding to the request based on the compliance status and also based on the authorization status is performed by at least one of the following resources:
a web-based collaborative platform;
a document management and storage system;
a hosted messaging solution;
a workplace chat and videoconferencing platform; or
a software-as-a-service.

13. The method of claim 6, wherein at least one compliance criterion relies on at least one of the following:
an application registration age;
an application publisher identification; or
an application identity certification.

14. The method of claim 6, wherein the method conforms with a zero-trust principle by verifying the application compliance status in response to the access request before granting access.

15. A computer-readable storage device configured with data and instructions which upon execution by a processor cause a computing system to perform a method for controlling access by an application to a resource in a cloud without involving any reverse proxies, the method comprising:

noting a request from the application to access the resource in the cloud;

determining a compliance status of the application with respect to at least one compliance criterion of an access control policy at least in part by checking an application identity representation for a compliance attribute data structure of an identity service, wherein the at least one compliance criterion relies on at least one of: an application certificate which identifies a publisher of the application, a determination that a publisher of the application is not untrusted, a determination that a publisher of the application is trusted, a change in which application publishers are trusted, a registration age of the application, a value of a compliance attribute data structure of the application, an application certificate renewal status, a service principal property, an application attribute which is not stored in a identity service which stores an identity representation of the application, a change in an attribute of an application identity representation of the application, an application publisher identification, or a certification of an identity of the application;

ascertaining an authorization status of the request with respect to an authorization credential of the request and an authorization requirement of the resource; and responding to the request based on the compliance status and also based on the authorization status.

16. The computer-readable storage device of claim 15, wherein responding to the request includes at least one of:

denying access when the access control policy specifies access denial based on the compliance status even though the authorization status is consistent with allowing access; or denying access based on the authorization status even though the compliance status is consistent with allowing access.

17. The computer-readable storage device of claim 15, wherein ascertaining the authorization status of the request includes checking a resource identity representation in an identity service for the authorization requirement.

18. The computer-readable storage device of claim 15, wherein values of the compliance status are not limited to Boolean values.

19. The computer-readable storage device of claim 15, wherein the method provides access control which is free of reliance on a cloud security proxy.

* * * * *